Jan. 18, 1938. J. BIJUR 2,105,468
LUBRICATION
Original Filed Aug. 9, 1922
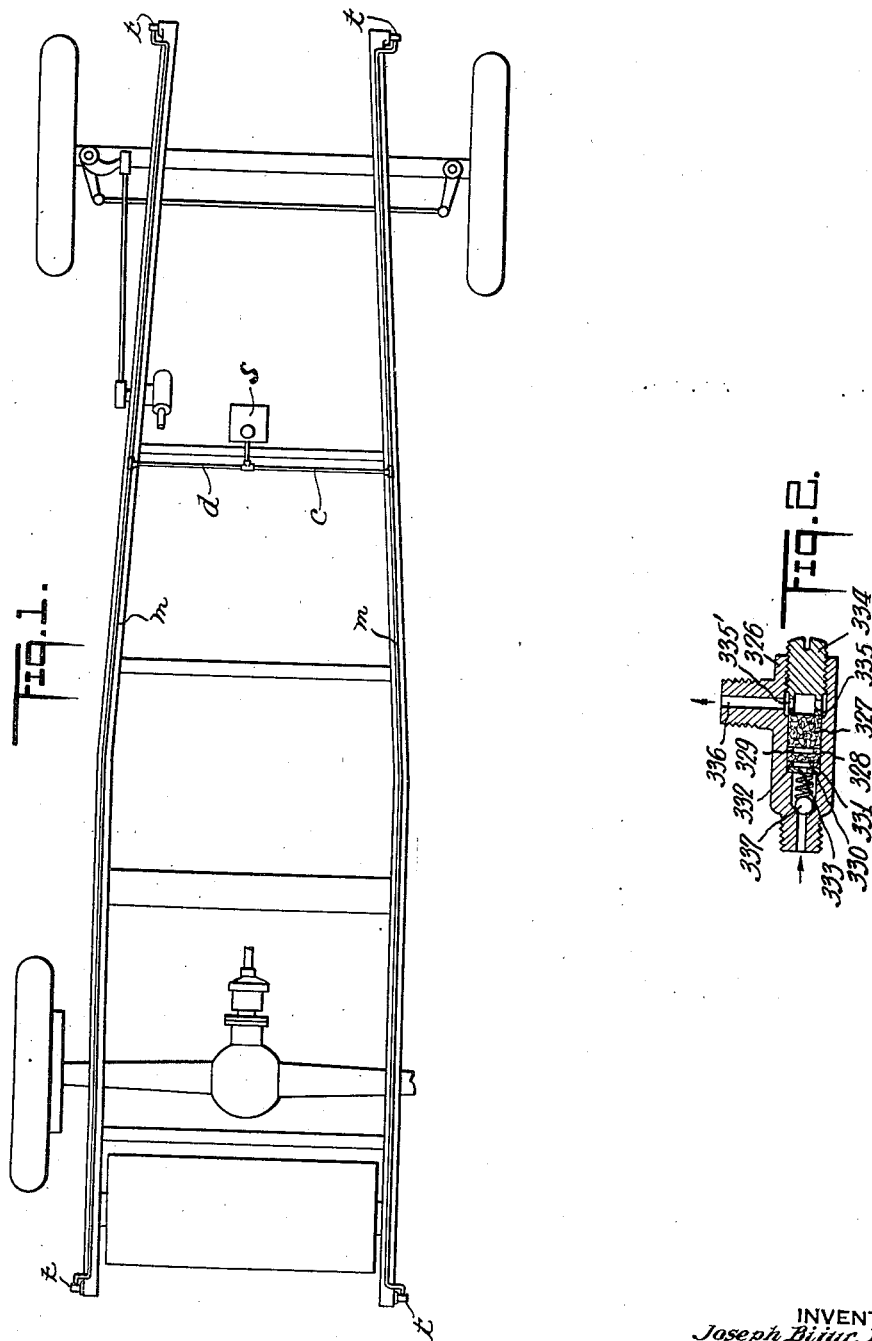
INVENTOR
Joseph Bijur, Deceased.
by George Bijur, Executor.
BY
Dean Fairbank Ainel & Foster
ATTORNEYS Patented Jan. 18, 1938

2,105,468

UNITED STATES PATENT OFFICE 2,105,468

LUBRICATION

Joseph Bijur, deceased, late of New York, N. Y., by George Bijur, executor, New York, N. Y.; said Joseph Bijur, assignor by mesne assignments, to Auto Research Corporation, a corporation of Delaware Original application August 9, 1922, Serial No. 580,668. Divided and this application October 9, 1934, Serial No. 747,498

9 Claims. (Cl. 184—7)

The present application relates to central lubricating systems which may be utilized upon automobiles and other mechanisms, and which find a particular field of utilization in feeding relatively small amounts of lubricant to the bearings of automobile chasses and various automatic machinery.

The present application relates to flow metering outlets of the general type described and claimed in United States Patents No. 1,632,771 and No. 1,632,772, the flow rating of which is not subject to fortuitous variation. Said patents are particularly directed to a type of flow metering device in which the restriction member consists of a rigid metallic rod or pin fitted in a bore of slightly larger diameter.

The present application is particularly directed to devices in which the restriction materials are composed of a compressible material, such as felt, which compressible material may be adjustably compressed from the exterior of the fittings.

This application is a division of application Serial No. 580,668, filed August 9, 1922, now Patent No. 1,975,920.

In the accompanying drawing in which are shown one or more of various possible embodiments of the several features of the invention, Fig. 1 is a diagrammatic view indicating the application of the central lubricating system of the present invention to a chassis, Fig. 2 is a transverse sectional view on a larger scale showing the construction of one embodiment of a preferred metering or drip plug.

Referring now to the drawing, in Fig. 1 there is shown diagrammatically the general layout of the chassis of an automobile having a lubricant supply unit S, illustratively on the dashboard. The supply unit S may be fed from the engine oil pump or a separate reservoir may be provided and it may include a manually and/or automatically operated pump actuated directly from the machine being lubricated, as by a mechanical drive, or indirectly by an inertia motor, a piston motor or a diaphragm motor to feed the bearings intermittently or continuously. The distributing system includes headers $c$ and $d$, which communicate at their ends with the respective mains $m$ extending the length of the channel frames and feeding various bearings at or near which the drip plug terminals $t$ are applied. Bridging conduits (not shown) are provided leading to similar drip plugs (not shown) at or near the corresponding bearings on the axle or other unsprung parts.

One preferred form of seepage fitting is shown in Fig. 2, comprising an elbow-shaped fitting 326 of one integral piece. The seepage mass 327 in the bore 328 of the fitting in this particular embodiment is spaced by a ring 329 from a thin or auxiliary filter disk 330 in turn spaced from shoulder 331 by a spacer cap 332 perforated as at 333. In this embodiment, the pressure screw plug 334 in the end of the fitting is shown with a circular flange projection 335 in lieu of the teat shown in other embodiments, and presses against the periphery of the end of the seepage mass 327, and is perforated as at 335' for communication with the nipple passage 336. The relief valve 337 is provided in the intake end of the fitting, as in other embodiments.

In operation, it will be seen that any dirt or dust passing into the fitting are intercepted by the thin filter disk 330, the clean oil passing on to the compacted seepage mass 327.

It is, of course, understood that the seepage or drip plug construction described may be used on any lubricating line, in the rim thereof or at the end thereof or in combination with junctions or casings and adjacent to and/or removed from the bearing, as shown in Patents Nos. 1,845,827, 1,862,482, 1,903,499, 1,929,434, 1,937,507 and 1,943,326.

Where it is desirable to maintain the lines substantially filled with lubricant at all times, the lines should be sealed so as to prevent air being drawn in at a higher outlet and lubricant seeping out at a lower outlet as by spring seated ball or flat disc valves, oil seals as shown in devices of Patent No. 1,734,027, and/or by springless flap and free floating disk valves, which valves may be included in the "drip plugs" and/or placed at the heads of the branches or lines feeding lubricant to a single bearing or a group of bearings at the same levels.

Fig. 2 of the present application corresponds to Fig. 25a of said parent application Serial No. 580,668 and Fig. 1 corresponds to Fig. 1 of said parent application somewhat simplified.

The fittings of Fig. 2 may be used for other purposes than in the combination described and covered in Patent No. 1,975,920 and they may be used as control fittings in non-centralized systems.

The invention however is not intended to be restricted to any particular construction or arrangement of parts, or to any particular method of operation or manner of use, or to any of the various details thereof, herein shown and described, as the same may be modified in various particulars or may be applied in many varied ways without departing from the spirit and scope of the claimed invention. The practical embodiments herein illustrated are described merely as showing some of the various features entering into the application of the invention.

What is claimed is:

1. A lubricant flow metering fitting comprising a plurality of separated cylinders of felt arranged in series and adjustable threaded means, accessible from the exterior of the fitting, to compress said felt cylinders at their periphery.

2. A lubricant flow metering fitting comprising a casing with a cylindrical bore, a plurality of felt discs in said bore, means to compress said discs and means to adjust said compressing means from the exterior of the fitting.

3. A lubricant flow metering fitting comprising a plurality of separated cylinders of felt arranged in series and threaded means to compress said felt cylinders, said cylinders being of increasing restricting effect in the direction of flow.

4. A lubricant flow metering fitting comprising a plurality of separated cylinders of felt arranged in series and threaded means to compress said felt cylinders, said means being provided with an annular compressing rim, whereby the compression is limited to the periphery of the discs.

5. A lubricant flow metering fitting comprising a plurality of separated cylinders of felt arranged in series and threaded means to compress said felt cylinders, said threaded means including at its exterior end an exteriorly accessible fillister slot, and at its inner end an annular projection to contact the exterior of said felt cylinder and said means being also provided with a bore to draw off lubricant from the central portions of the cylinders.

6. In a seepage fitting, in combination, a seepage cartridge having an obstruction, an inlet, means operable from the exterior for varying the resistance of the obstruction therein to adjust the flow through the fitting, said cartridge having an outlet for communication with a bearing, said obstruction being annularly compressed from one end of the fitting.

7. A flow metering device comprising a central chamber with inlet and outlet ports and containing a compressible restriction means, and compression means adjustable to vary the compression of said restriction means, said compression means also carrying a flow passage to conduct the lubricant to said outlet port from said restriction means.

8. In a seepage fitting, in combination, a seepage cartridge having an obstruction, an inlet, means operable from the exterior for varying the resistance of the obstruction to adjust the flow through the fitting, said cartridge having an outlet for communication with a bearing, said means carrying a connecting passageway for conducting lubricant from said obstruction to said exit port.

9. A flow metering device comprising a central chamber with inlet and outlet ports and containing a compressible restriction means, and compression means adjustable to vary the compression of said restriction means, said compression means having a cup shaped face against said restriction means, said cup being provided with an outlet passageway which conducts lubricant to said outlet port from said restriction means.

GEORGE BIJUR,
*Executor of the Estate of Joseph Bijur, Deceased.*